United States Patent [19]

Pellaux

[11] 4,310,216
[45] Jan. 12, 1982

[54] PROCESS FOR MANUFACTURING A DEVICE FOR COUPLING AT LEAST TWO LIGHT CONDUCTORS AND A COUPLING DEVICE ACCORDING TO THIS PROCESS

[75] Inventor: Jean-Paul Pellaux, Neuchatel, Switzerland

[73] Assignee: Cabloptic S.A., Cortaillod, Switzerland

[21] Appl. No.: 98,250

[22] Filed: Nov. 28, 1979

[30] Foreign Application Priority Data

Dec. 1, 1978 [CH] Switzerland ............... 12298/78

[51] Int. Cl.³ ................... G02B 5/32; G03H 1/04
[52] U.S. Cl. ................. 350/3.72; 350/96.18; 350/96.21
[58] Field of Search ............... 350/96.18, 96.2, 3.7, 350/320, 3.69, 3.77, 3.86, 96.21

[56] References Cited

U.S. PATENT DOCUMENTS 3,666,345  5/1972  Maslowski ............... 350/3.7
4,057,319  11/1977  Ash et al. ............... 350/96.14

FOREIGN PATENT DOCUMENTS 54-3561  1/1979  Japan ............... 350/3.72

Primary Examiner—John K. Corbin
Assistant Examiner—Bruce Y. Arnold
Attorney, Agent, or Firm—Cushman, Darby & Cushman

[57] ABSTRACT

A provisional holographic lens $H_1$ is recorded by causing the interference of a parallel reference beam with a divergent beam emitted from an optical fibre 27, and then a definitive holographic lens $H_2$ is recorded by causing the converging, conjugate beam to the divergent beam to be formed by illuminating the provisional holographic lens by the reference beam and using this converging, conjugate beam to interfere with the beam emitted by an optical fibre 31. The definitive holographic lens $H_2$ and the ends of the fibres 27 and 31 are embedded in a block of hardenable transparent synthetic material. The provisional holographic lens $H_1$ may be positioned externally of this block or be enclosed with the other elements in this same block.

This process in particularly advantageous, because it permits certain delicate optical adjustments to be eliminated and because it avoids certain causes of light loss.

10 Claims, 7 Drawing Figures

PROCESS FOR MANUFACTURING A DEVICE FOR COUPLING AT LEAST TWO LIGHT CONDUCTORS AND A COUPLING DEVICE ACCORDING TO THIS PROCESS

BACKGROUND OF THE INVENTION

The invention relates to a process for manufacturing a coupling device for at least two light conductors by means of at least one coupling holographic lens and to the coupling device obtained by this process.

Optical fibre couplers using one or several coupling holographic lens are already known. For example, U.S. Pat. No. 4,057,319 discloses a coupling device which optically connects two optical fibres which are each made fast with a rigid support element. These support elements, themselves mounted in a casing, are disposed on either side of an annular support carrying two holographic lens provided with phase holograms. Such an arrangement involves the mechanical mounting inside a casing of the end guides of the optical fibres, on the one hand, and of the holographic lens, on the other hand. Apart from the fact that the manipulation of the holograms is a delicate operation, the mechanical mounting of the elements necessitates that the machining is very precise. This requires that great care the taken during manufacturing, which renders the manufacture difficult and costly and in addition the result which is obtained does not provide all the required guarantees of precision and reliability.

SUMMARY OF THE INVENTION

An object of the present invention is to avoid these disadvantages by providing a coupling device which is extremely simple, inexpensive and extremely accurate.

To this end, the process according to the invention includes the steps of fixing the free ends of the said light conductors, into a block of transparent synthetic polymeric resin having at least one slot disposed in the interference zone of beams emitted by the said ends of light conductors, introducing a sensitive substance, capable of recording a phase and volume hologram, into the said slot, illuminating the said substance by coherent light beams for forming a grid of interference fringes on the said substance, recording and fixing said grid so as to form the said coupling holographic lens.

According to a particularly useful embodiment of the process according to the invention, the step of fixing the free ends of the light conductors into the block of polymeric resin is carried out simultaneously with formation of this block, by pouring the resin or a precursor material thereof into a mould. To that effect, the free ends of the light conductors, preferably mounted in guiding end elements, are introduced into the mould, the resin or precursor thereof is then poured into the mould, while providing at least one slot in the interference zone of the beams emitted by the light conductors, and the resin is hardened, so as to form a block of hardened transparent synthetic polymeric resin, the case being after formation of the resin by chemical reaction of its precursor material.

The coupling device according to the invention comprises at least one holographic lens having at least one phase and volume hologram and at least two light conductors arranged in such manner that their free ends and also the said holographic lens are set in the same block of hardened transparent synthetic polymeric resin.

In accordance with one preferred embodiment, the process as defined above is carried out in two phases, a first phase which permits the establishment of an intermediate holographic lens and the second phase, which uses the said intermediate holographic lens for establishing a definitive holographic lens used in the coupling device.

One of the main advantages of this process arises from the fact that it is possible to eliminate one of the optical adjustments which are usually required, when using the known processes, for injecting light into the optical fibres. Now this injection is generally carried out by means of a microscope objective, and this represents a relatively delicate operation. Thereafter, in order to have a good injection, it is necessary to adjust the focal point on the middle of the fibre, i.e. an effective area of the order of 30 to 50$\mu$, this being an operation which can only be carried out satisfactorily with the assistance of a micrometric device. Moreover, the wave front emitted by the objective is not directly acceptable by the fibre and this causes a loss of light. Consequently, the suppression of an optical adjustment eliminates a certain number of problems as regards critical focussing and positioning and in addition avoids one cause of light loss.

The injection by means of a provisional holographic lens avoids all these adjustments. Furthermore, the provisional holographic lens restores the light to equilibrium, that is to say, it performs reconstruction of a wave front which is directly acceptable by the receiving fibre; in other words, it performs reconstruction of a light directly injected under the characteristic propagation conditions of the wave guide, and as a consequence avoids the losses caused by dispersion effect which are observed in the conventional couplings and due to the fact that the wave guide essentially favours certain modes of propagation.

Another advantage of the present invention results from the fact that it is also possible to embed the provisional holographic lens in the mass of the coupling device. As a consequence, the possibility is maintained of taking action at any time on the fibre, in the case where such an action would be necessary during the use of the coupling device.

BRIEF DESCRIPTION OF THE DRAWING

The present invention and its advantages will be better understood by referring to the description of one preferred embodiment of the coupling device according to the invention and to the accompanying drawings in which.

DESCRIPTION OF THE PREFERRED EMBODIMENTS

Figure 1:
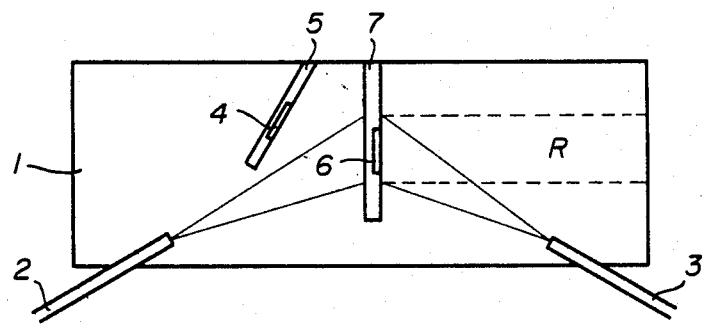
FIG. 1 represents a coupling device according to the invention, the lens being formed of a single hologram, and the provisional holographic lens being included in the moulded block.

Referring now to FIG. 1, the coupling device as illustrated is in the form of a block 1 of hardened transparent synthetic material, preferably a polymerised resin, which is for example of cylindrical form. Embedded in the mass of this block are the end sections 2 and 3 of two fibres which are preferably mounted in metallic guiding elements or end elements, which are preferably placed on templates before being moulded on and embedded in the synthetic material. This block comprises a first holographic lens 4, which is hereinafter referred to as the provisional lens $H_1$ and is lodged in a first slot 5. This lens is disposed in the interference zone of the reference beam R and that of the divergent beam emitted by the end of the section of optical fibers 3. It then comprises a second holographic lens 6, which is hereinafter referred to as definitive lens $H_2$ and is lodged in a second slot 7. The principle as regards recording the two holograms will be described in greater detail by reference to FIGS. 2 to 4.

In the example illustrated, the provisional holographic lens is included in the block. It is quite evident that this holographic lens could be mounted externally or on one of the faces of the block, in which case it would be appropriate to take into account refraction phenomena due to the passage of the rays from one medium into another.

In practice, it is frequently preferred that the end pieces of the fibres and the provisional and definitive holograms are embedded at the same time in the same block, so that it is always possible to take action on the fibre during the use of the coupling device.

Figure 2:
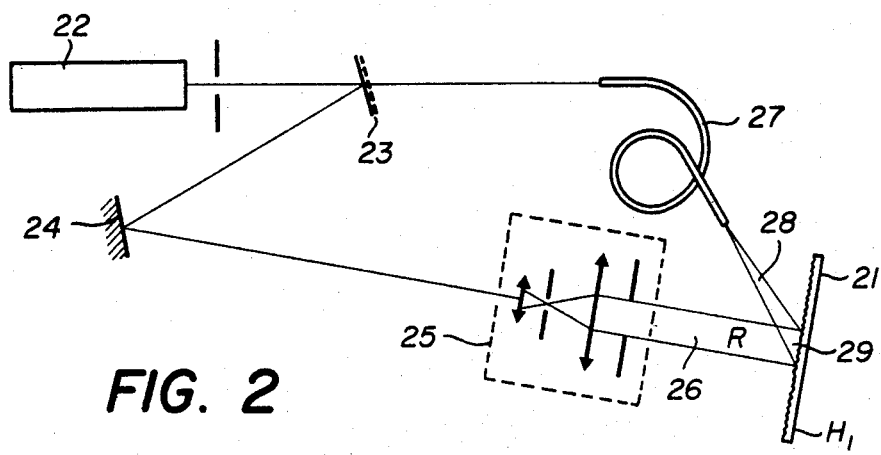
FIGS. 2 and 3 illustrate the principle of recording a holographic lens by means of a provisional holographic lens.
Figure 3:
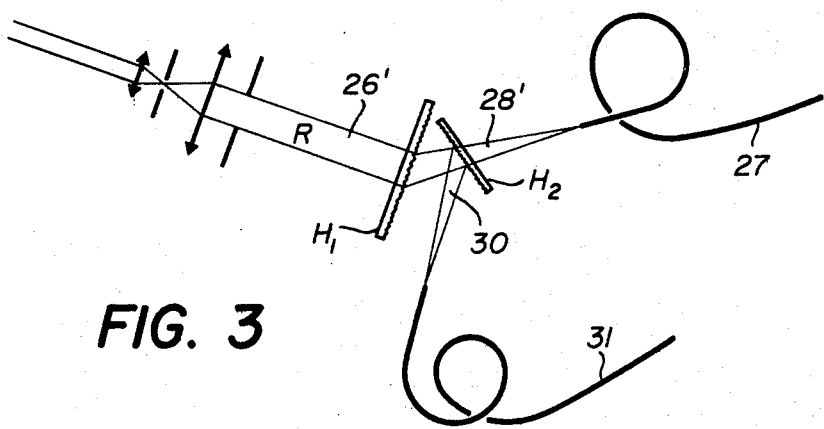
Figure 4:
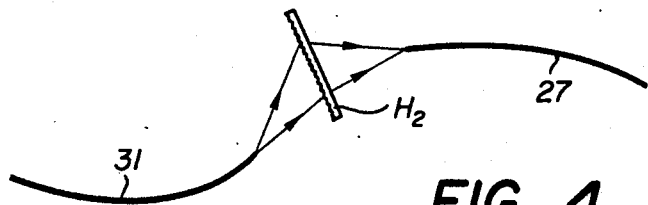
FIG. 4 represents the geometry of the reconstruction of the light by means of the recorded and fixed definitive holographic lens.

FIGS. 2, 3 and 4 represent diagrammatically the principles involved in developing and using a holographic lens with a single hologram, such as that which is embedded in the block of synthetic material in FIG. 1. The procedure for recording the definitive holographic lens $H_2$ comprises two steps. The first step consists in establishing a provisional lens, hereinafter called $H_1$, or injection lens, this phase being more specifically described by reference to the layout diagram in FIG. 2. This layout comprises essentially a layer of substance 21 capable of forming a phase and volume hologram, such as a thin film of photopolymerisable substance, dichromated gelatine, crystals enjoying photochromic properties or a photodegradable substance, deposited on a support or poured into a slot provided for this purpose in the block of solidified transparent synthetic material. In addition, it comprises a coherent light source 22 and a beam separator 23, which permits of injecting a part of the light into an optical fibre 27 and of using the other part of the light reflected by a plane mirror 24, in order to develop a reference beam 26 which is filtered and made parallel by means of a spatial filter 25. The part of the coherent light emitted by the source 22 and transmitted by the separator 23 into the optical fibre 27 emerges from this fibre in the form of a divergent beam 28, which falls obliquely on the sensitive substance 21 and more particularly on the area 29 illuminated by the reference beam 26. The interference image between the beam which comes from the fibre 27 and the reference beam is recorded by the sensitive substance and forms the provisional hologram $H_1$. The second step permits of forming a second holographic lens, which will represent the definitive lens $H_2$. To this end, the direction of the reference beam 26 is reversed, for example, by means of an optical system known per se, the said reference beam being transformed into its conjugate 26' in FIG. 3. By illuminating the provisional hologram $H_1$ by means of the conjugate reference beam 26', a beam 28' is reconstructed, which converges on the end of the fibre 27 and does in fact form the reconstructed beam 28 of FIG. 2. A second substance capable of forming a phase and volume hologram is then interposed in the interference zone between the reconstructed beam 28' and the beam 30 coming from the second optical fibre 31. The interference image recorded by the second substance constitutes the definitive holographic lens $H_2$ which is the interference image of the beam reconstructed by the provisional holographic lens $H_1$ and the beam emitted by the fibre 31.

As shown in FIG. 4, only the definitive holographic lens $H_2$ is subsequently used during a normal employment of the coupling device, such as that represented by FIG. 1. This coupling device comprises, as a minimum, the two optical fibres 27 and 31 and the definitive holographic lens $H_2$, this assembly being embedded in a block of transparent synthetic material. Nevertheless, as has already been previously described, it is frequently quite useful also to embed the provisional holographic lens $H_1$ in this same block, which latter holographic lens will no longer be used during the normal use of the coupling device, but which leaves open the possibility of subsequently taking action on the fibres, if this is proved to be necessary.

The recording of the hologram on the definitive holographic lens $H_2$ having been effected, it is appropriate for it to be finally fixed, preferably by a heat pulse which is applied to the entire block forming the coupling device or, in a more local manner, to the holographic lens itself, for example, by means of a heating wire embedded in the mass of the block in the vicinity of the holographic lens. When the sensitive substance capable of recording a phase and volume hologram on the holographic lens $H_2$ is a photopolymer, the fixation can be effected by a light pulse, followed or accompanied by a momentary raising of the temperature. In the case where the provisional holographic lens $H_1$ is withdrawn, there is no need for the latter to be fixed. On the other hand, when the provisional holographic lens and the definitive holographic lens are embedded at one and the same time in the block of transparent synthetic material, then both of them are fixed.

Figure 5:
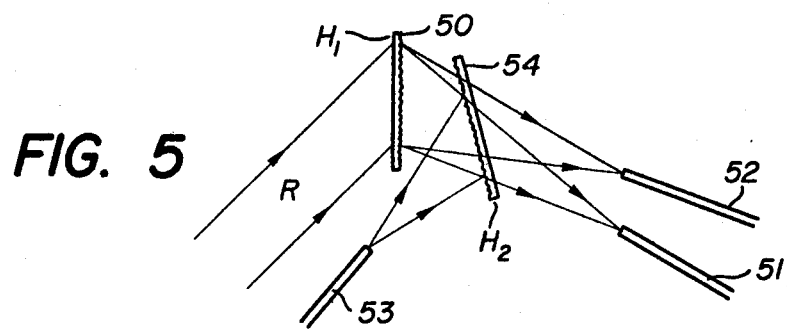
FIGS. 5 and 6 illustrate the principle of recording a holographic lens for a Y junction having one hologram, using an intermediate holographic lens
Figure 6:
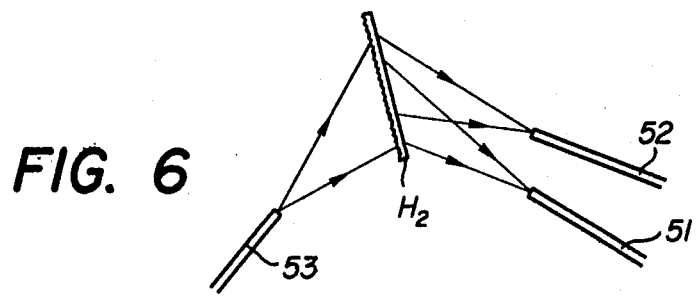

FIGS. 5 and 6 illustrate the technique for recording a coupling device which is called a Y junction, comprising a definitive holographic lens $H_2$ which is established, as previously, by means of an intermediate holographic lens $H_1$. The recording principle is based on the fact that it is possible to record several holograms on a single sensitive substance. The efficacy of light collection depends on the amplitude of the recorded spatial grid. The recording principle is substantially the same as that previously described. The interference image between a reference beam R and the beams emitted by two optical fibres 51 and 52 are recorded successively on the same layer of sensitive substance 50. The successive recording of these two interference systems constitutes the provisional holographic lens $H_1$. Interference is then caused between the beams restored by the provisional holographic lens $H_1$, illuminated by the conjugate reference of beam R and a beam emitted from an optical fibre 53. A second sensitive substance 54 is interposed in the interference zone of the beams restored by the provisional holographic lens $H_1$ and the beam emitted from the fibre 53. The recording of this interference system constitutes the definitive holographic lens $H_2$, which will be used as a coupling holographic lens between the fibre 53 and the fibres 51 and 52, as shown in FIG. 6. As previously, the ends of the fibres 51, 52, 53, mounted in cylindrical end guides are embedded in a block of transparent synthetic material which also contains the definitive holographic lens $H_2$. As previously, the provisional holographic lens $H_1$ may also be embedded in this same block, although it will no longer be used during the normal functioning of the coupling device. By way of example, the recording of a Y junction can be effected in accordance with the following two methods:

FIRST METHOD: The reference beams and the fibre beams have the same intensity.

a. an exposure $(F_2+R)$ is made, in which $F_2$ is the light intensity in the fibre 51 and R is the intensity of the reference beam, the energy of exposure being given by the efficiency of collection which is desired in the fibre 51.

b. an exposure $(F_3+R)$ is made, in which $F_3$ is the light intensity in the fibre 52, until such time as the maximum exposure energy is reached.

SECOND METHOD: The intensities are distributed in the beams emitted from the fibres 51 and 52 according to the desired reconstruction efficacies. With each recording $(F_2+R)$ and $(F_3+R)$, the intensity of the reference beam has to correspond to the intensities $F_2+F_3$. The exposures will also be divided for each of the recordings.

Figure 7:
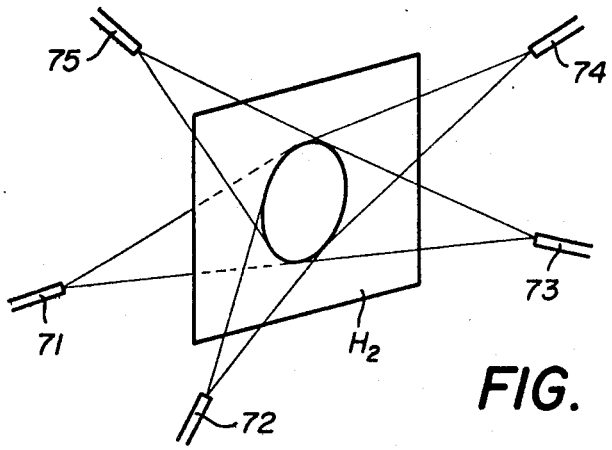
FIG. 7 represents diagrammatically a multiple or radial junction having one hologram.

FIG. 7 illustrates diagrammatically a multiple junction permitting an entry optical fibre 71 to be coupled, for example, with four exit fibres, 72, 73, 74 and 75. The technique employed for the recording of the holograms of provisional holographic lens $H_1$ and definitive holographic lens $H_2$ of the multiple junction coupling device is identical with that used for the Y junction. It is based on the principle that it is possible to record several holograms on the same sensitive substance. A succession of holograms will be recorded by means of the same reference beam. The exposures for each hologram will take into account the intensities collected in each of the branches of the junction. This type of junction can be used in the two directions; it is possible to divide the light emitted from one fibre and to re-inject it into the fibres 72 to 75 in accordance with a predetermined intensity distribution. Inversely, it is possible to regroup the light originating from the four fibres 72 to 75 in a single fibre 71, the light intensity in the fibre 71 being then equal to the sum of the intensities of the light in the four fibres 72 to 75.

As previously, the ends of the fibres mounted in end pieces, as well as the definitive hologram by itself or the provisional and definitive holographic lens are embedded in the same block of transparent synthetic material, which forms a coupling device.

We claim:

1. A process for manufacturing a device for coupling at least two light conductors by means of at least one coupling holographic lens, said process including the steps of: fixing the free ends of the said light conductors into a block of transparent synthetic polymeric resin having at least one slot disposed in the interference zone of beams emitted by the said ends of light conductors; introducing a sensitive substance, capable of recording a phase and volume hologram, into the said slot; illuminating the said substance by a first beam and a second beam of coherent light to form a grid of interference fringes and expose the said substance; recording and fixing said grid so as to form the said coupling holographic lens.

2. A process according to claim 1 wherein the illuminating step comprises the following sub-steps:
exposing a first holographic lens comprising a phase and volume hologram by using the interference pattern between a parallel reference beam and a first divergent beam emitted by a first light conductor;
recording and fixing said first holographic lens;
reconstructing the converging, conjugate beam to said first divergent beam by re-illuminating the same side of said first holographic lens by the said parallel reference beam to thereby form said first beam of coherent light;
using the divergent beam emitted by the end of said second light conductor as said second beam of coherent light.

3. A process according to claim 1, wherein said recorded grid is fixed by means of a heat pulse.

4. A process according to claim 1, wherein the said fixing said grid sub-step is effected by carrying out a provisional fixation by a flash of white light immediately after recording said grid and wherein there is further provided a subsequent definitive fixing said grid sub-step by means of a momentary raising of the temperature of the support of the recording.

5. A process according to claim 1, wherein the sensitive substance capable of forming a phase and volume hologram is a photopolymerisable substance.

6. A process according to claim 1, wherein the sensitive substance capable of forming a phase and volume hologram comprises crystals having photochromic properties.

7. A process according to claim 1, wherein the sensitive substance capable of forming a phase and volume hologram is a dichromated gelatine.

8. A process according to claim 1, wherein the sensitive substance capable of forming a phase and volume hologram is a photodegradable substance.

9. A device for coupling at least two light conductors by means of a coupling holographic lens comprising: at least one holographic lens having at least one phase and volume hologram recorded therein; at least two light conductors having free ends; and a mass of hardened transparent synthetic resin wherein said at least one holographic lens and said free ends of said at least two light conductors are imbedded in said mass of hardened transparent synthetic resin with said holographic lens in the interference zone of beams emitted by said free ends of said light conductors.

10. A device in accordance with claim 9 having an additional holographic lens comprising at least one phase and volume hologram recorded therein, said lens imbedded in said mass of hardened transparent synthetic resin.

* * * * *